(12) United States Patent
Usui et al.

(10) Patent No.: US 7,618,723 B2
(45) Date of Patent: Nov. 17, 2009

(54) GLASS SUBSTRATE FOR MAGNETIC DISK, ITS PRODUCTION METHOD AND MAGNETIC DISK

(75) Inventors: Hiroshi Usui, Chiyoda-ku (JP); Osamu Miyahara, Chiyoda-ku (JP); Katsuaki Miyatani, Chiyoda-ku (JP); Yoshinori Kon, Chiyoda-ku (JP); Iori Yoshida, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 72 days.

(21) Appl. No.: 11/765,702

(22) Filed: Jun. 20, 2007

(65) Prior Publication Data

US 2008/0020679 A1 Jan. 24, 2008

(30) Foreign Application Priority Data

Jul. 18, 2006 (JP) .............................. 2006-195396
Sep. 27, 2006 (JP) .............................. 2006-262514

(51) Int. Cl.
*G11B 5/66* (2006.01)
*G11B 5/64* (2006.01)
*C03C 6/06* (2006.01)
*C03B 9/14* (2006.01)

(52) U.S. Cl. .................... 428/846.9; 428/848.6; 65/61; 510/178

(58) Field of Classification Search ................ 438/690, 438/691, 692, 693; 51/298, 299, 308, 309; 65/61, 30.14; 510/178; 428/846.9, 848.2, 428/848.6, 848.8
See application file for complete search history.

(56) References Cited

U.S. PATENT DOCUMENTS

| 6,595,028 | B1 * | 7/2003 | Miyamoto et al. ......... 65/30.14 |
| 2002/0059755 | A1 * | 5/2002 | Kido et al. .................... 51/309 |
| 2002/0170237 | A1 * | 11/2002 | Vogt et al. .................... 51/308 |
| 2003/0077982 | A1 | 4/2003 | Takizawa |
| 2003/0136055 | A1 * | 7/2003 | Li et al. ......................... 51/298 |
| 2004/0223898 | A1 * | 11/2004 | Ota et al. .................... 423/263 |
| 2005/0126080 | A1 | 6/2005 | Kon et al. |
| 2006/0014390 | A1 * | 1/2006 | Lee et al. .................... 438/692 |
| 2006/0148667 | A1 * | 7/2006 | Fukasawa et al. ........... 510/178 |
| 2007/0269987 | A1 * | 11/2007 | Nakano et al. .............. 438/693 |

FOREIGN PATENT DOCUMENTS

| JP | 2003-173518 | 6/2003 |
| JP | 2006-82138 | 3/2006 |
| WO | 2004/100242 * | 7/2004 |
| WO | WO 2006/103858 A1 | 10/2006 |

OTHER PUBLICATIONS

U.S. Appl. No. 11/765,702, Jun. 20, 2007, Usui et al.
U.S. Appl. No. 11/739,997, Apr. 25, 2007, Miyatani et al.

* cited by examiner

*Primary Examiner*—D. Lawrence Tarazano
*Assistant Examiner*—Louis Falasco
(74) *Attorney, Agent, or Firm*—Oblon, Spivak, McClelland, Maier & Neustadt, L.L.P.

(57) ABSTRACT

A method for producing a glass substrate for a magnetic disk by polishing a circular glass plate, which comprises a step of polishing the principal plane of the circular glass plate by using a slurry containing at least one water-soluble polymer selected from the group consisting of a water-soluble organic polymer having amino groups, a water-soluble organic polymer having amine salt groups and a water-soluble organic polymer having quaternary ammonium salt groups, and colloidal silica.

16 Claims, 1 Drawing Sheet

GLASS SUBSTRATE FOR MAGNETIC DISK, ITS PRODUCTION METHOD AND MAGNETIC DISK

CROSS REFERENCE TO RELATED APPLICATION

Figure 1:
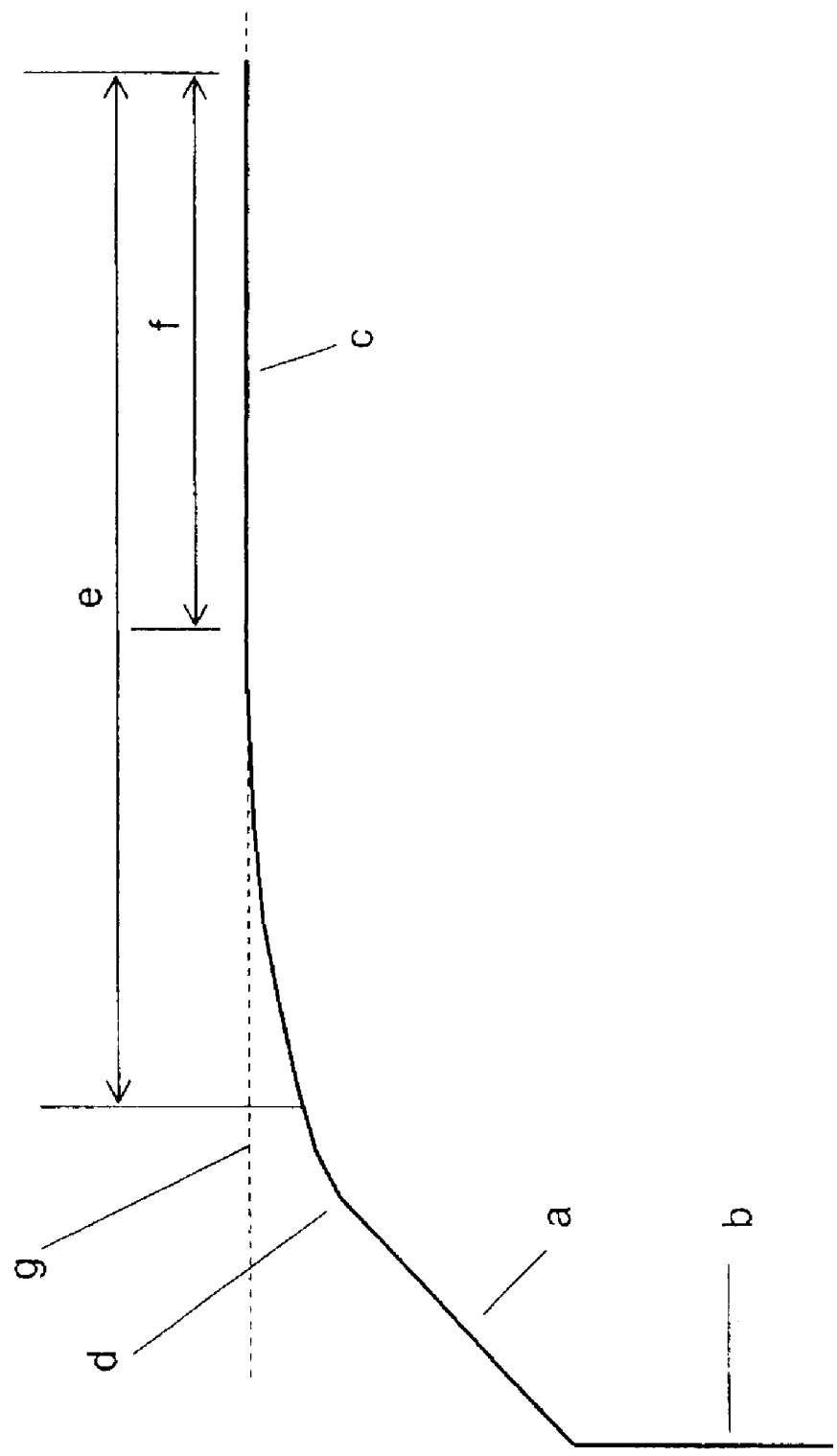

The present application claims priority to the following Japanese Patent Applications: JP 2006-195396, filed on Jul. 18, 2006 and JP 2006-262514, filed on Sep. 27, 2006.

The present invention relates to a glass substrate for a magnetic disk, a method for polishing the principal plane of the glass substrate, and a magnetic disk.

Demand for high recording density of magnetic disks to be mounted on information processing devices such as hard disk drives is increasing in recent years, and under these circumstances, glass substrates are now widely used instead of conventional aluminum substrate.

Demand for high recording density is increasingly high, and to meet such a demand, as a method of polishing the principal plane of a glass substrate with high precision, a method of using a polishing slurry containing colloidal silica has been proposed (e.g. Patent Documents 1 and 2).

A method disclosed in Patent Document 1 is that an alkali is incorporated in a polishing liquid containing colloidal silica and that the pH of the polishing liquid is adjusted to be higher than 10.2 and at most 12.

A method disclosed in Patent Document 2 is to solve a problem that very small convex protrusions are formed on the principal plane, by applying the method disclosed in Patent Document 1, and employs, as abrasive particles, abrasive particles containing colloidal silica formed by hydrolyzing an organic silicone compound.

Patent Document 1: JP-A-2003-173518
Patent Document 2: JP-A-2006-82138

The method disclosed in Patent Document 2 which employs colloidal silica formed by hydrolyzing an organic silicone compound has had such problems that such colloidal silica is expansive as compared with colloidal silica produced by conventional sodium silicate method and is hardly applicable to production of a glass substrate for a magnetic disk, which is required to be available at a low cost.

Further, it is considered that even though colloidal silica produced by conventional sodium silicate method is used, it is possible to reduce the surface roughness to a certain extent by using a soft polishing pad. However, in such a case, the time required for polishing tends to be long.

Further, it is considered to be possible to reduce the surface roughness to a certain extent by prolonging the polishing time, but the problem of formation of very small convex protrusions can hardly be solved.

Under these circumstances, it is an object of the present invention to provide a method capable of overcoming the above problem, e.g. capable of polishing the principal plane of a glass substrate with high precision, even though the colloidal silica is not one formed by hydrolyzing an organic silicone compound.

The above very small convex protrusions are so-called convex defects by masking. The convex defects are very small convex protrusions formed after polishing since the removal rate at very small portions on the substrate covered with e.g. gel-like silica attached to the substrate during polishing is small as compared with the other portion of the substrate.

The present invention provides a method for producing a glass substrate for a magnetic disk by polishing a circular glass plate, which comprises a step of polishing the principal plane of the circular glass plate by using a slurry (hereinafter this slurry will be referred to as the slurry of the present invention) containing at least one water-soluble polymer selected from the group consisting of a water-soluble organic polymer having amino groups, a water-soluble organic polymer having amine salt groups and a water-soluble organic polymer having quaternary ammonium salt groups, and colloidal silica.

The present invention further provides a glass substrate for a magnetic disk, wherein the arithmetical mean roughness (hereinafter the arithmetical mean roughness will be referred to as Ra) of the principal plane is at most 0.16 nm as measured by an atomic force microscope, and the degree of roll-off at the outer peripheral portion of the principal plane is at most 50 nm.

Here, the degree of roll-off in the present invention will be described below.

FIG. 1 is a cross-section schematically illustrating a portion including the outer peripheral portion of the principal plane, the chamfered plane and the outer peripheral edge surface.

The symbol "a" represents the chamfered plane, b the outer peripheral edge surface, c the principal plane outer peripheral portion, and d the boundary between the chamfered plane "a" and the principal plane outer peripheral portion c.

The linear dotted line in FIG. 1 is a base line g to determine the degree of roll-off (sagging at the edge portion). This base line g is determined as a straight line which overlaps with a portion f at a portion of from 2.5 mm to 5 mm from the boundary d towards the center of the principal plane on the principal plane outer peripheral portion c, or which approximates to the portion f the most.

On the principal plane outer peripheral portion c, a portion of from 0.25 mm to 5 mm from the boundary d towards the center of the principal plane is a roll-off measurement region e.

The degree of roll-off corresponds to the difference between the maximum height and the minimum height of the principal plane outer peripheral portion c in the roll-off measurement region e from the base line g. In a case where the principal plane outer peripheral portion c is above the base line g, the height is a positive value, and in a case where it is below the base line g, the height is a negative value.

Further, the present invention provides a magnetic disk comprising a glass substrate for a magnetic disk produced by the above method for producing a glass substrate for a magnetic disk or the above glass substrate for a magnetic disk, and a plurality of layers including a magnetic layer to be a recording layer laminated on the glass substrate.

The present inventors have found that Ra is low when the principal plane of a circular glass plate is polished by using a polishing pad with high hardness by using a slurry containing colloidal silica and having a polyoxypropylene diamine added thereto, as compared with the case of polishing without adding a polyoxypropylene diamine. The present invention has been accomplished on the basis of this discovery.

According to the method for producing a glass substrate for a magnetic disk of the present invention, a glass substrate for a magnetic disk with Ra of at most 0.16 nm which has not been obtained by a conventional method is obtained even when a polishing pad with high hardness is used.

Further, a glass substrate for a magnetic disk wherein Ra of the principal plane is at most 0.16 nm and the degree of roll-off at the principal plane outer peripheral portion is at most 50 nm, is obtained.

Further, the above convex defects by masking can be reduced.

Now, the present invention will be described in detail with reference to the preferred embodiments.

According to the method for producing a glass substrate for a magnetic disk of the present invention (hereinafter referred to as the production method of the present invention), a glass substrate is produced usually by means of the following steps. Namely, a circular hole is put at the center of a circular glass plate, and chamfering, lapping of the principal plane and mirror polishing of the edge surface are sequentially carried out. Then, such circular glass plates thus processed are laminated, inner peripheral edge surfaces are etched, and the etched inner peripheral edge surfaces are coated with, for example, a polysilazane compound-containing liquid by e.g. spraying, followed by firing to form a coating film (protective coating film) on the inner peripheral edge surfaces. Then, the principal plane of each circular glass plate, on the inner peripheral edge surface of which a coating film is formed, is polished to be a flat and smooth surface, thereby to obtain a glass substrate for a magnetic disk.

The production method of the present invention is not limited to the above. For example, brush polishing may be applied to the inner peripheral edge surfaces instead of formation of a protective coating film on the inner peripheral edge surfaces; the principal plane lapping step may be divided into a coarse lapping step and a precise lapping step, and a shape-processing step (perforation at the center of the circular glass plate, chamfering and polishing of the edge surface) may be provided between the coarse and precise lapping steps, or chemical tempering step may be provided after the principal plane polishing step, as disclosed in Patent Document 2. Needless to say, for production of a glass substrate having no circular hole at the center, perforation at the center of the circular glass plate is unnecessary.

The principal plane lapping is carried out usually by using alumina abrasive particles or metal oxide abrasive particles including alumina having an average particle size of from 6 to 8 μm.

The lapped principal plane is polished usually in a removal amount of from 30 to 40 μm, and then polished by using the slurry of the present invention, so that Ra is typically at most 0.16 nm.

For polishing of the principal plane, first, the principal plane is polished by using a slurry containing cerium oxide having an average particle size of from 0.9 to 1.8 μm and a urethane polishing pad.

Then, the principal plane is further polished by using the slurry of the present invention under a polishing pressure of, for example, from 0.5 to 30 kPa. The polishing pressure is preferably at least 4 kPa. If it is less than 4 kPa, stability of the glass substrate during polishing tends to decrease, and the waviness on the principal plane tends to be significant resultingly.

The polishing pad to be used for polishing by using the slurry of the present invention, is typically a polishing pad made of a polyurethane foam having a Shore D hardness of from 45 to 75, a compressibility of from 0.1 to 10% and a density of from 0.5 to 1.5 g/cm$^3$, a polyurethane foam having a Shore A hardness of from 30 to 99, a compressibility of from 0.5 to 10% and a density of from 0.2 to 0.9 g/cm$^3$, or a polyurethane foam having a Shore A hardness of from 5 to 65, a compressibility of from 0.1 to 60% and a density of from 0.05 to 0.4 g/cm$^3$. The Shore A hardness of the polishing pad is preferably at least 20. If it is less than 20, the removal rate may be low.

The Shore D hardness and the Shore A hardness are respectively measured by a method of measuring the durometer A hardness and D hardness of a plastic as stipulated in JIS K7215.

Further, the compressibility (unit: %) is measured as follows. Namely, a polishing pad is cut into an appropriate size to prepare a sample. The thickness $t_0$ of the sample when a load of a stress of 10 kPa is applied to the sample in a non-load state for 30 seconds is measured by a Schopper type thickness measuring apparatus. Then, the thickness $t_1$ of the sample when a load of a stress of 110 kPa is immediately applied to the sample in a state where the thickness is $t_0$, for 5 minutes, is measured. From these values $t_0$ and $t_1$, $(t_0-t_1) \times 100/t_0$ is calculated and regarded as the compressibility.

In measurement of the Shore D hardness and the Shore A hardness of the polishing pad, polishing pad samples are overlaid and their hardness is measured, and the hardness thus measured may be inappropriate as the hardness of a polishing pad which controls the polishing phenomenon.

Thus, the present inventors decided to regard the hardness measured by using a general purpose automatic hardness meter for rubber, digi test manufactured by Bareiss capable of measuring hardness of each polishing pad sample and an IRHD microdetector, as the hardness of a polishing pad (hereinafter this hardness will be referred to as pad hardness). That is, measurement of the pad hardness is carried out under a certain dead load in accordance with Method M (microsize test for medium hardness) of international rubber hardness degree (IRHD) test stipulated by ISO48.

The step of polishing the principal plane is not limited thereto. For example, prior to polishing by using the slurry of the present invention, the principal plane may be polished by using a slurry containing cerium oxide having an average particle size of from 0.15 to 0.25 μm and a polishing pad made of urethane so that Ra is from 0.4 to 0.6 nm and that microwaviness (Wa) is, for example, at most 0.2 nm measured in a range of 1 mm×0.7 mm under a condition of a wavelength range of λ≦0.25 mm by means of a three-dimensional surface structure analyzing microscope (e.g. NV200, manufactured by Zygo Co., Ltd.), or a conventional colloidal silica slurry may be used instead of the above cerium oxide-containing slurry. The loss of the plate thickness (removed amount) is typically from 1 to 2 μm by the above additional polishing.

Now, the slurry of the present invention will be described below. The contents of the respective components in the slurry are represented by mass percentages.

The pH of the slurry is preferably from 8 to 12. If it is less than 8, colloidal silica is likely to agglomerate e.g. in a case where the colloidal silica is prepared by sodium silicate method. It is more preferably at least 9. If it exceeds 12, handling tends to be difficult.

The type of the colloidal silica is not limited, but commonly used is one prepared by sodium silicate method, such as COMPOL-80 manufactured by FUJIMI INCORPORATED.

The content of the colloidal silica in the slurry of the present invention is typically from 5 to 40%.

A water-soluble organic polymer having amino groups, a water-soluble organic polymer having amine salt groups and a water-soluble organic polymer having quaternary ammonium salt groups are components which reduce Ra on the principal plane, and at least one of them must be contained. It is considered that convex protrusions tend to be selectively abraded to lower Ra, since such a water-soluble polymer has amino groups or amine salt groups which are likely to adhere to silicate glass.

The content of such a water-soluble polymer in the slurry is preferably from 0.001 to 10%. If it is less than 0.001%, the above Ra may not sufficiently be small. It is more preferably at least 0.1%, particularly preferably at least 0.5%. If it exceeds 10%, the removal rate may remarkably decrease. It is more preferably at most 5%.

The water-soluble organic polymer having amino groups (hereinafter referred to as a water-soluble polyamine) is any polymer so long as it is a water-soluble compound having at least two amino groups in one molecule. In the present specification, water-solubility may be of any degree so long as the polymer is completely dissolved in a polishing compound liquid as visually observed at a concentration at which the liquid is used as a polishing compound. Usually, water-solubility means that at least 1 mass % of the polymer is dissolved in pure water, preferably at least 5 mass %, more preferably at least 30 mass %. Specifically, preferred is at least one water-soluble polymer selected from the group consisting of a water-soluble polyether polyamine, a water-soluble polyalkylene polyamine, a polyethyleneimine, a water-soluble polyvinylamine, a water-soluble polyallylamine, a water-soluble polylysine and a water-soluble chitosan. A particularly preferred water-soluble polyamine is a water-soluble polyether polyamine or a water-soluble polyalkylene polyamine.

The molecular weight of the water-soluble polyamine is not particularly limited so long as the polyamine is water-soluble, but it is preferably from 100 to 100,000, more preferably from 100 to 2,000, by the weight average molecular weight. If the weight average molecular weight is less than 100, the effect of the water-soluble polyamine tends to be small. If it exceeds 100,000, even though the polyamine is water-soluble, it may adversely affect physical properties of the polishing compound such as fluidity. If the weight average molecular weight exceeds 2,000, solubility in pure water decreases in many cases. A particularly preferred water-soluble polyamine is a water-soluble polyether polyamine or a water-soluble polyalkylene polyamine having a weight average molecular weight of from 100 to 2,000.

A particularly preferred water-soluble polyamine in the present invention is at least one water-soluble polyamine selected from the group consisting of a water-soluble polyether polyamine having a weight average molecular weight of from 100 to 2,000 and a water-soluble polyalkylene polyamine having a weight average molecular weight of from 100 to 2,000. From the viewpoint of high effect of stabilizing dispersion of colloidal silica, the weight average molecular weight of the water-soluble polyether polyamine is more preferably from 150 to 800, furthermore preferably from 100 to 400.

The above polyether polyamine is a compound having at least two amino groups and at least two etheric oxygen atoms. The amino group is preferably a primary amino group ($—NH_2$). The polyether polyamine may have a secondary amino group (—NH—) or a tertiary amino group as amino groups, but the polyether polyamine in the present invention is preferably a compound having at least two primary amino groups and having substantially no other amino groups, particularly preferably a polyether diamine having two primary amino groups alone. The polyether polyamine is preferably a compound having such a structure that a hydrogen atom of a hydroxyl group in a polyhydric alcohol or a polyether polyol is substituted by an aminoalkyl group. The polyhydric alcohol is preferably a dihydric to hexahydric alcohol, particularly preferably a dihydric alcohol, and the polyether polyol is preferably a dihydric to hexahydric polyoxyalkylene polyol, particularly preferably a polyoxyalkylene diol. The aminoalkyl group is preferably a $C_{2-6}$ aminoalkyl group such as a 2-aminoethyl group, a 2-aminopropyl group, a 2-amino-1-methylethyl group, a 3-aminopropyl group, a 2-amino-1,1-dimethylethyl group or a 4-aminobutyl group.

The polyhydric alcohol is preferably a $C_{2-8}$ dihydric alcohol which may have an etheric oxygen atom, such as ethylene glycol, diethylene glycol, propylene glycol or dipropylene glycol. The polyether polyol is preferably a polyether diol of which the repeating unit is a $C_{2-6}$ oxyalkylene group, such as a polyethylene glycol (i.e. polyoxyethylene diol) such as triethylene glycol or tetraethylene glycol, a polypropylene glycol (i.e. polyoxypropylene diol) such as tripropylene glycol or tetrapropylene glycol, or a polyoxyalkylene diol having at least two types of oxyalkylene groups, such as poly(oxypropylene/oxyethylene) diol.

The polyalkylene polyamine is a compound having at least three amino groups bonded via an alkylene group. Preferably, the terminal amino group is a primary amino group and the amino group in the interior of the molecule is a secondary amino group. More preferred is a linear polyalkylene polyamine having a primary amino group at both molecular terminals and having at least one secondary amino group in the interior of the molecule. At least three bonding moieties consisting of an alkylene group, sandwiched between an amino group and another amino group, exist in one molecule, and such a plurality of bonding moieties between amino groups may be the same or different. Preferably, all these moieties are the same, or two bonding moieties between amino groups bonded to the primary amino group at both terminals are the same and the other bonding moiety between amino groups is different. One bonding moiety between amino groups preferably has from 2 to 8 carbon atoms, particularly preferably each of the two bonding moieties between amino groups bonded to the primary amino group at both terminals has from 2 to 8 carbon atoms and the other bonding moiety between amino groups has from 2 to 6 carbon atoms.

Each of the polyether diamine and the polyalkylene polyamine is preferably a compound having a structure of the following formula (1):

wherein R is a $C_{2-8}$ alkylene group, X is an oxygen atom or —NH—, and k is an integer of at least 2 in the case of a polyether diamine or an integer of at least 1 in the case of a polyalkylene polyamine, provided that a plurality of R's in one molecule may be different.

Particularly, the polyether diamine is preferably a compound having a structure of the following formula (2), and the polyalkylene polyamine is preferably a compound having a structure of the following formula (3):

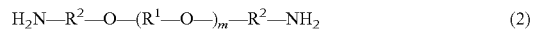

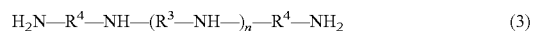

wherein $R^1$ is an ethylene group or a propylene group, $R^2$ is a $C_{2-6}$ alkylene group, $R^3$ is a $C_{2-6}$ alkylene group, $R^4$ is a $C_{2-8}$ alkylene group, m is an integer of at least 1, and n is an integer of at least 1, provided that $R^1$ and $R^2$ may be the same or different, and $R^3$ and $R^4$ may be the same or different.

Specifically, the polyether diamine of the formula (2) may, for example, be a polyoxypropylene diamine (a compound wherein $R^1$ and $R^2$ are propylene groups and m is at least 1), polyoxyethylene diamine (a compound wherein $R^1$ and $R^2$ are ethylene groups and m is at least 1), or 4,7,10-trioxatridecane-1,13-diamine (a compound wherein $R^1$ is an ethylene group, $R^2$ is a trimethylene group and m is 2). Specifically, the polyalkylene polyamine of the formula (3) may, for example, be tetraethylenepentamine (a compound wherein $R^3$ and $R^4$ are ethylene groups and n is 2), pentaethylenehexamine (a compound wherein $R^3$ and $R^4$ are ethylene groups and n is 3), heptaethyleneoctamine (a compound wherein $R^3$ and $R^4$ are ethylene groups and n is 5), N,N'-bis(3-aminopropyl)-ethylenediamine (a compound wherein $R^3$ is an ethylene group, $R^4$ is a trimethylene group and n is 1), or N,N'-bis(2-aminoethyl)-1,4-butanediamine (a compound wherein $R^3$ is a tetramethylene group, $R^4$ is an ethylene group and n is 1).

The water-soluble organic polymer having amine salt groups may, for example, be a coconut amine, a hardened beef tallow amine, a rosin amine or an ethylene oxide-addition type higher alkyl amine.

The water-soluble organic polymer having quaternary ammonium salt groups may, for example, be a polymer wherein the quaternary ammonium salt groups are an ethylene oxide addition type quaternary ammonium salt or a diquaternary ammonium salt.

Now, the glass substrate of the present invention will be described below.

Ra and the degree of roll-off are in a trade-off relation, and it has been difficult to prevent drawbacks such as crash even when the flying height of a magnetic head is reduced and to prevent drawbacks such as crash in the vicinity of the edge portion without disturbing the flying position of a magnetic head.

However, of the glass substrate for a magnetic disk of the present invention (the glass substrate of the present invention), the degree of roll-off is so small as at most 50 nm and Ra is so small as at most 0.16 nm. Thus, it is considered to be possible to overcome the above problem which has been difficult to solve.

Ra and the degree of roll-off of the glass substrate of the present invention are preferably at most 0.13 nm and at most 20 nm, respectively.

The magnetic disk of the present invention is characterized by using, as the substrate, the glass substrate of the present invention or a glass substrate produced by the production method of the present invention, and it is produced by a known method, for example, by laminating a plurality of layers including a magnetic layer to be a recording layer on the glass substrate.

Now, the present invention will be described in further detail with reference to Examples. However, it is should be understood that the present invention is by no means restricted to such specific Examples.

EXAMPLE 1

A silicate glass plate formed by float process was processed into a doughnut-type circular glass plate (a circular glass plate having a circular hole at its center) from which a glass substrate having an outer diameter of 65 mm, an inner diameter of 20 mm and a thickness of 0.635 mm would be obtained. The inner and outer peripheral edge surfaces were ground by diamond abrasive particles, and the upper and lower surfaces of the glass plate were lapped by alumina abrasive particles.

Then, the inner and outer peripheral edge surfaces were chamfered with a chamfer width of 0.15 mm and a chamfer angle of 45°.

After the inner and outer peripheral edge surfaces were processed, mirror finish processing was carried out on the edge surfaces by brush polishing using the cerium oxide slurry as a polishing compound and using a brush as a polishing tool. The processing amount was 30 μm by the removed amount in the radius direction.

Then, upper and bottom principal planes were polished by a double side polisher using a cerium oxide slurry (cerium oxide average particle size: about 1.1 μm) as a polishing compound and using a urethane pad as a polishing tool. The processing amount was 35 μm in total in the direction of the thickness between the upper and lower principal planes.

Further, the upper and lower principal planes were polished by a double side polisher using, as a polishing compound, cerium oxide (average particle size: about 0.2 μm) having an average particle size smaller than that of the above cerium oxide and using a urethane pad as a polishing tool. The processing amount was 1.6 μm in total in the direction of the thickness between the upper and lower principal planes.

The principal plane of the circular glass plate thus prepared was observed by an atomic force microscope manufacture by Veeco Instruments and as a result, the surface roughness Ra was 0.48 nm.

Further, a slurry of the present invention were prepared as follows.

COMPOL-80 manufactured by FUJIMI INCORPORATED was diluted with distilled water to prepare 2 kg of a slurry liquid containing water and colloidal silica at a solid content concentration of 24 mass %.

Further, 200 g of polyoxypropylene diamine (tradename: polyetheramine D230) manufactured by BASF, having a weight average molecular weight of 230, was added to 1.8 kg of distilled water, followed by stirring to prepare a polyetheramine aqueous solution. The content of the polyetheramine in this aqueous solution is 10 mass %.

The above prepared slurry liquid and aqueous solution were mixed to prepare a slurry (dispersion). The pH of the slurry was 10.9.

The principal plane of the above circular glass plate with Ra of 0.48 nm was polished by using a polishing pad made of a polyurethane foam having a pad hardness of 55.5, a Shore A hardness of 53.5°, a compressibility of 1.9% and a density of 0.24 g/cm$^3$ as a polishing tool and using the above slurry as a polishing compound, under a polishing pressure of 14.7 kPa at a carrier circumferential speed of 14 m/min for 20 minutes. As a result, a glass substrate having Ra on the principal plane of 0.129 nm was obtained. The removed amount was 0.18 μm.

Before measurement of Ra, the following cleaning was carried out. That is, cleaning by pure water shower, scrub cleaning with PVA (poly-vinyl alcohol) sponge and water, scrub cleaning with PVA (poly-vinyl alcohol) sponge and an alkali detergent, scrub cleaning with PVA (poly-vinyl alcohol) sponge and water, and cleaning by pure water shower were sequentially carried out, and then air blowing was carried out.

EXAMPLE 2

An aqueous solution to be mixed with the slurry liquid was prepared as follows. Namely, 120 g of a polyetheramine was added to 1.88 kg of distilled water, followed by stirring to prepare a polyetheramine aqueous solution. The content of the polyetheramine in this aqueous solution is 6 mass %. The polyetheramine aqueous solution was mixed with 2 kg of the same slurry liquid as in Example 1 to prepare a slurry having a pH of 10.8.

Polishing was carried out for 20 minutes in the same manner as in Example 1 except that the above slurry was used as a slurry to obtain a glass substrate with Ra on the principal plane of 0.130 nm. The removed amount was 0.18 μm.

EXAMPLE 3

An aqueous solution to be mixed with the slurry liquid was prepared as follows. Namely, 40 g of a polyetheramine was added to 1.96 kg of distilled water, followed by stirring to prepare a polyetheramine aqueous solution. The content of the polyetheramine in this aqueous solution is 2 mass %. The polyetheramine aqueous solution was mixed with 2 L of the same slurry liquid as in Example 1 to prepare a slurry having a pH of 10.6.

Polishing was carried out for 20 minutes in the same manner as in Example 1 except that the above slurry was used as a slurry to obtain a glass substrate with Ra on the principal plane of 0.146 nm. The removed amount was 0.19 µm.

EXAMPLE 4

Polishing was carried out in the same manner as in Example 1 except that double side polishing was carried out by using a polishing pad made of a polyurethane foam having a pad density of 40.6, a Shore A hardness of 79°, a compressibility of 0.5% and a density of 0.54 g/cm$^3$ as a polishing tool, under a polishing pressure of 12 kPa, at a carrier circumferential speed of 40 m/min for a polishing time of 50 minutes. As a result, a glass substrate with Ra on the principal plane of 0.125 nm and a degree of roll-off of 15.2 nm was obtained. The removed amount was 0.90 µm. The degree of roll-off was measured by using NV200 manufactured by Zygo Co., Ltd.

Further, with respect to 19 very small defects present on the principal plane of the glass substrate thus obtained, the shape and the components of the defects were analyzed by SEM-EDX and as a result, non of them were convex defects by masking.

COMPARATIVE EXAMPLE 1

The above COMPOL-80 was diluted with distilled water to prepare a slurry having a solid content concentration of 12 mass %. Polishing was carried out in the same manner as in Example 1 except that the above slurry was used as a slurry to obtain a glass substrate with Ra on the principal plane of 0.176 nm. The removed amount was 0.37 µm.

COMPARATIVE EXAMPLE 2

Polishing was carried out in the same manner as in Example 4 except that one prepared by diluting the above COMPOL-80 with distilled water to have a solid content concentration of 12 mass % was used as a slurry and that polishing was carried out for 45 minutes, to obtain a glass substrate with Ra on the principal plane of 0.132 nm and a degree of roll-off of 112.3 nm. The removed amount was 0.90 µm.

It is considered that Ra was so small as the same level as in Example 4 because polishing was carried out for a long time of 50 minutes by using a soft polishing pad having a pad density of 40.6.

Whereas, polishing was carried out under the similar conditions as in Comparative Example 2 except that the slurry in Comparative Example 2 was used, and with respect to five very small defects present on the principal plane of the obtained glass substrate, the shape and the components of the defects were analyzed in the same manner as in Example 4 and as a result, three of them were convex defects by masking.

The present invention is applicable to production of a glass substrate for a magnetic disk.

The entire disclosures of Japanese Patent Application No. 2006-195396 filed on Jul. 18, 2006 and Japanese Patent Application No. 2006-262514 filed on Sep. 27, 2006 including specifications, claims, drawing and summaries are incorporated herein by reference in their entireties.

What is claimed is:

1. A method for producing a glass substrate for a magnetic disk, which comprises:
   polishing the principal plane of a circular glass plate with a slurry comprising at least one water-soluble polyether polyamine and colloidal silica, wherein
   said slurry has a pH of from 8 to 12, and
   upon polishing, the arithmetical mean roughness of the principal plane of the glass plate is at most 0.16 nm as measured by an atomic force microscope, and the degree of roll-off at the outer peripheral portion of the principal plane is at most 50 nm.

2. The method for producing a glass substrate for a magnetic disk according to claim 1, wherein the slurry further comprises at least one water-soluble polyalkylene polyamine.

3. The method for producing a glass substrate for a magnetic disk according to claim 1, wherein the slurry further comprises a quaternary ammonium salt of an ethylene oxide or a diquaternary ammonium salt.

4. The method for producing a glass substrate for a magnetic disk according to claim 1, wherein the water-soluble polyether polyamine is present in an amount of from 0.001 to 10% by mass.

5. The glass substrate for a magnetic disk according to claim 1, wherein the arithmetical mean roughness is at most 0.13 nm.

6. The glass substrate for a magnetic disk according to claim 1, wherein the degree of roll-off at the outer peripheral portion of the principal plane is at most 20 nm.

7. A magnetic disk comprising a glass substrate for a magnetic disk produced by the method for producing a glass substrate for a magnetic disk as defined in claim 1, and a plurality of layers including a magnetic layer to be a recording layer laminated on the glass substrate.

8. A magnetic disk comprising the glass substrate for a magnetic disk as defined in claim 1, and a plurality of layers including a magnetic layer to be a recording layer laminated on the glass substrate.

9. The method for producing a glass substrate for a magnetic disk according to claim 1, further comprising polishing said circular glass plate with a slurry comprising cerium oxide.

10. The method for producing a glass substrate for a magnetic disk according to claim 1, wherein said colloidal silica is present in an amount of from 5 to 40% by mass.

11. The method for producing a glass substrate for a magnetic disk according to claim 1, wherein said at least one water-soluble polyether polyamine is represented by formula (1):

$$H_2N-(R-X-)_k-R-NH_2 \qquad (1)$$

wherein
   each R is independently a $C_{2-8}$ alkylene group,
   X is an oxygen atom, and
   k is an integer of at least 2.

12. The method for producing a glass substrate for a magnetic disk according to claim 1, wherein said at least one water-soluble polyether polyamine has a weight average molecular weight of from 100 to 2000.

13. The method for producing a glass substrate for a magnetic disk according to claim 2, wherein said at least one water-soluble polyalkylene polyamine has a weight average molecular weight of from 100 to 2000.

14. The method for producing a glass substrate for a magnetic disk according to claim 1, wherein said at least one water-soluble polyether polyamine is at least one selected from the group consisting of polyoxypropylene diamine; polyoxyethylene diamine; and 4,7,10-trioxa-tridecane-1,13-diamine.

15. The method for producing a glass substrate for a magnetic disk according to claim 1, wherein said pH is at least 9.

16. The method for producing a glass substrate for a magnetic disk according to claim 1, wherein the water-soluble polyether polyamine is present in an amount of from 0.5 to 10% by mass.

* * * * *